United States Patent
Weinberg et al.

(10) Patent No.: US 7,720,376 B2
(45) Date of Patent: May 18, 2010

(54) CAMERA WITH ACCELERATION SENSOR

(75) Inventors: Harvey Weinberg, Sharon, MA (US);
Christophe Lemaire, Boxford, MA (US); Howard Samuels, Newton, MA (US); Michael Judy, Ipswich, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 12/389,446

(22) Filed: Feb. 20, 2009

(65) Prior Publication Data

US 2009/0154910 A1  Jun. 18, 2009

Related U.S. Application Data

(62) Division of application No. 11/335,156, filed on Jan. 19, 2006.

(60) Provisional application No. 60/648,780, filed on Feb. 1, 2005.

(51) Int. Cl.
G03B 7/26 (2006.01)
G03B 17/00 (2006.01)

(52) U.S. Cl. ......................... 396/301; 396/52

(58) Field of Classification Search .................. 396/50, 396/52, 53, 55, 301, 302, 303; 348/208.99, 348/208.4, 208.12, 208.16
See application file for complete search history.

(56) References Cited

U.S. PATENT DOCUMENTS

| | | | |
|---|---|---|---|
| 4,448,510 A | 5/1984 | Murakoshi |
| 4,787,051 A | 11/1988 | Olson |
| 4,801,793 A | 1/1989 | Vaynshteyn |
| 4,862,172 A | 8/1989 | Ross |
| 5,227,889 A | 7/1993 | Yoneyama et al. |
| 5,335,032 A | 8/1994 | Onuki et al. |
| 5,363,120 A | 11/1994 | Drumm |
| 5,555,061 A | 9/1996 | Soshi et al. |
| RE35,583 E | 8/1997 | Hamada et al. |
| 5,699,112 A | 12/1997 | Bacs, Jr. |
| 5,709,249 A | 1/1998 | Okada et al. |
| 5,794,078 A | 8/1998 | Okazaki |
| 5,826,115 A | 10/1998 | Washisu et al. |

(Continued)

FOREIGN PATENT DOCUMENTS

DE  195 31 289  2/1997

(Continued)

OTHER PUBLICATIONS

JP-2002-374572 A_Machine Translation retrieved from JPO website.*

*Primary Examiner*—W. B. Perkey
*Assistant Examiner*—Minh Q Phan
(74) *Attorney, Agent, or Firm*—Sunstein Kann Murphy & Timbers LLP

(57) ABSTRACT

A method and system for determining camera positioning information from an accelerometer mounted on a camera. The accelerometer measures the orientation of the camera with respect to gravity. Orientation measurement allows user interface information to be displayed in a "right side up" orientation on a viewfinder for any camera orientation. Alternatively, an artificial horizon indicator may be displayed in the viewfinder. The accelerometer may also measure camera movement. Camera movement information together with camera orientation can be used to determine camera usage. Additionally, camera movement information can be used to determine a minimum shutter speed for a sharp picture.

8 Claims, 10 Drawing Sheets

U.S. PATENT DOCUMENTS

| | | |
|---|---|---|
| 5,868,031 A | 2/1999 | Kokush et al. |
| 5,878,283 A | 3/1999 | House et al. |
| 5,881,321 A | 3/1999 | Kivolowitz |
| 5,898,421 A | 4/1999 | Quinn |
| 5,943,512 A | 8/1999 | Hamada et al. |
| 5,999,211 A | 12/1999 | Hedges et al. |
| 6,011,926 A | 1/2000 | Cockell |
| 6,091,448 A | 7/2000 | Washisu et al. |
| 6,516,151 B2 | 2/2003 | Pilu |
| 6,438,393 B1 | 8/2003 | Suuronen |
| RE38,361 E | 12/2003 | Hamada et al. |
| 6,747,690 B2 | 6/2004 | Molgaard |
| 6,751,410 B1 | 6/2004 | Stavely |
| 6,757,488 B2 | 6/2004 | Washisu |
| 6,810,207 B2 | 10/2004 | Sato et al. |
| 6,858,810 B2 * | 2/2005 | Zerbini et al. ............ 200/61.08 |
| 6,912,386 B1 | 6/2005 | Himberg et al. |
| 7,331,724 B2 | 2/2008 | Hasegawa et al. |
| 2002/0030856 A1 | 3/2002 | Kumagai |
| 2002/0047906 A1 * | 4/2002 | Ohta ........................... 348/208 |
| 2002/0061189 A1 * | 5/2002 | Sato ............................ 396/55 |
| 2003/0038779 A1 | 2/2003 | Baron et al. |
| 2003/0076408 A1 | 4/2003 | Dutta |
| 2004/0073087 A1 | 4/2004 | Glukhovsky et al. |
| 2004/0130628 A1 | 7/2004 | Stavely |
| 2004/0141085 A1 | 7/2004 | Nickel et al. |
| 2004/0145613 A1 | 7/2004 | Stavely et al. |
| 2004/0212699 A1 | 10/2004 | Molgaard |
| 2005/0007467 A1 | 1/2005 | Battles et al. |
| 2005/0008355 A1 | 1/2005 | Sato et al. |
| 2005/0117024 A1 | 6/2005 | Lee |
| 2005/0146620 A1 | 7/2005 | Monroe et al. |

FOREIGN PATENT DOCUMENTS

| | | |
|---|---|---|
| JP | 2002-271654 | 9/2002 |
| JP | 2002374572 A * | 12/2002 |
| WO | WO 03/005702 | 1/2003 |
| WO | WO 03/088147 | 10/2003 |

* cited by examiner

CAMERA WITH ACCELERATION SENSOR

This application is a divisional of U.S. patent application Ser. No. 11/335,156, entitled "Camera with Acceleration Sensor," filed Jan. 19, 2006, the disclosure of which application is incorporated herein by reference. This application also claims priority from U.S. provisional patent application Ser. No. 60/648,780, filed Feb. 1, 2005, entitled "Camera with Acceleration Sensor", the disclosure of which application is incorporated herein by reference.

FIELD OF THE INVENTION

The invention generally relates to cameras and, more particularly, the invention relates to detecting motion of a camera.

BACKGROUND

In many cases, it is desirable to know the orientation of a camera. A digital camera, for example, could use this information to store the image such that it displays "right side up" on a computer display. Ball and cage type mechanical switches can be used to ascertain orientation, but they have reliability problems.

SUMMARY OF THE INVENTION

In accordance with embodiments of the invention, a digital camera includes an accelerometer mounted on the camera. The accelerometer measures camera movement and/or orientation. In various embodiments of the invention, this information can be used to:
- display an artificial horizon indicator on a viewfinder to aid in orienting the camera;
- display icons on the viewfinder in a "right side up" orientation according to the camera's orientation;
- use camera movement information to determine a minimum shutter speed, to reduce motion-induced picture blurring; and
- use camera movement and orientation to determine if a camera is in use; such "in-use" information can be used, for example, to power down an idle camera or to power-up a camera that is about to be used.

In one embodiment, the accelerometer provides orientation information for the camera with respect to the earth's gravity. This orientation information allows an artificial horizon indicator to be displayed on an image on a display surface, such as a viewfinder display attached to the camera. The user views the artificial horizon indicator and may realign the camera based on the relationship between the image and the indicator.

In another embodiment of the invention, the accelerometer provides orientation information for the camera with respect to the earth's gravity. Icons consisting of text and/or graphics are displayed on an image produced by the camera in a "right side up" orientation based on the camera orientation information received from the accelerometer. The image may be displayed on a viewfinder display or on a printed image of a picture.

A further embodiment of the invention adjusts image exposure time for a camera to reduce movement-induced image blurring. An accelerometer mounted to the camera provides acceleration information. The information is stored and peak-to-peak acceleration magnitude is calculated for the most recent time period. When picture taking is initiated, a minimum shutter speed is calculated as a function of the peak-to-peak acceleration magnitude over the most recent time period and the focal length of the camera. The exposure time of the picture may be adjusted accordingly.

Another embodiment of the invention determines if a camera is in use using camera orientation and camera movement information calculated from the outputs of the accelerometer. If a camera is determined not to be in use, elements of the camera can be placed in a low-power state and reenergized when the camera usage changes.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In various embodiments of the invention, an accelerometer can be used to determine the static orientation of a camera by measuring the direction of the earth gravity's (gravity vector) relative to the camera body. Other embodiments of the invention use an accelerometer to detect the dynamic movement of a camera. Orientation and/or dynamic movement information for a camera enable a variety of functions. Several such functions are discussed below in separate sections.

Figure 1A:
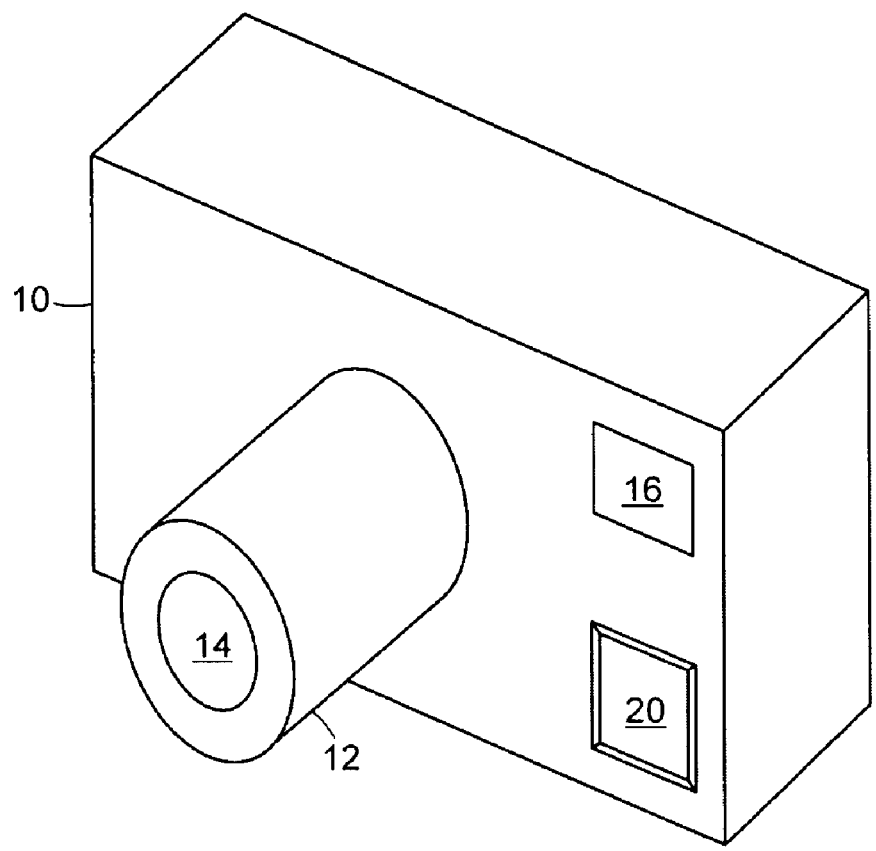
FIG. 1A shows a simplified perspective view of the front of a camera, according to an embodiment of the present invention.
Figure 1B:
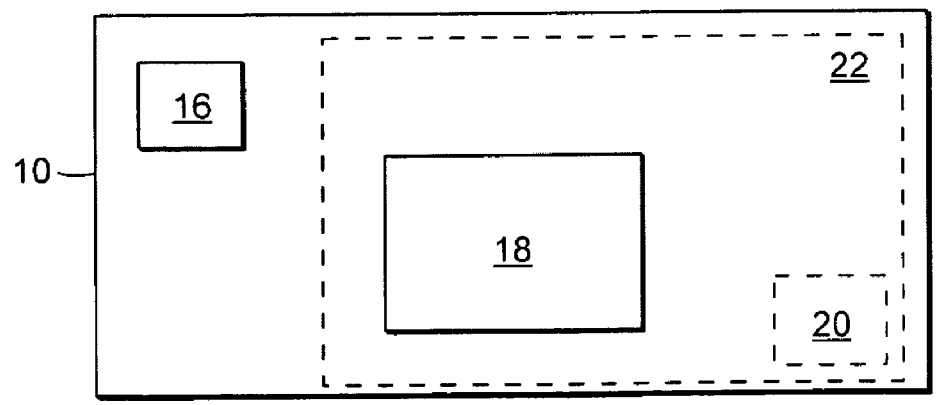
FIG. 1B shows a plan view of the rear of the camera of FIG. 1A.
Figure 2A:
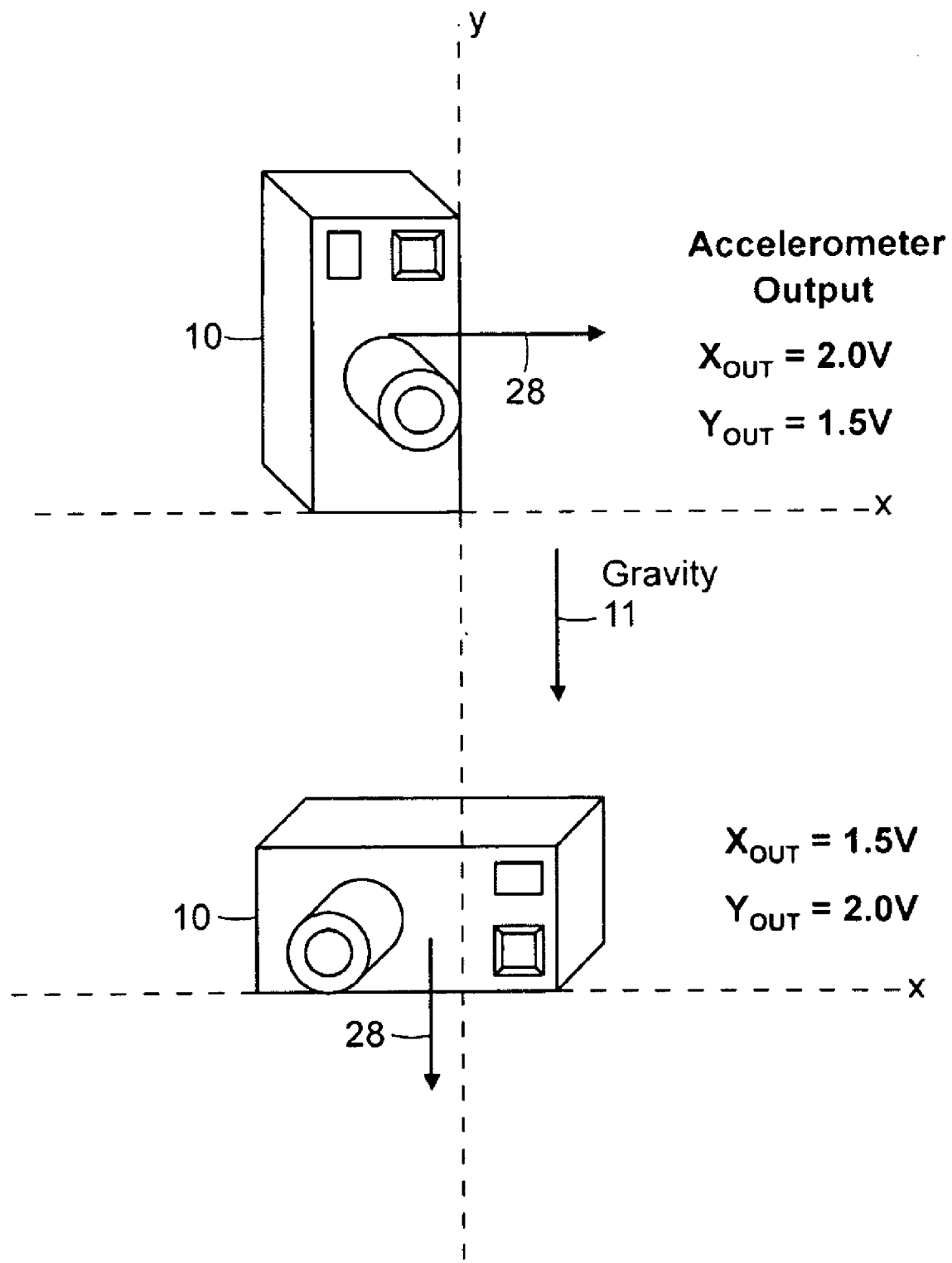
FIG. 2A shows schematically typical accelerometer outputs for two orientations of the camera of FIG. 1.

FIG. 1A is a simplified perspective view of the front of an exemplary camera 10, according to an embodiment of the invention. The camera 10 includes a lens 12 with a lens aperture 14. A viewfinder window 16 allows a user to frame a picture. Pressing a shutter switch 18 initiates picture taking. FIG. 1B shows a plan view of the rear of the camera. The user looks into the viewfinder window 16 and adjusts the camera's orientation to frame the picture. Alternatively, the user may look at a viewfinder display screen 18 on the back of the camera to frame the picture. In this description and in any appended claims, a "viewfinder," "viewfinder window" or a "viewfinder display" shall mean any visual display employed in a camera to aid in framing a picture. Mounted in the camera body may be a circuit board 22 which contains processing logic (e.g., microprocessor, ASICs, etc.) to control camera functions. Also mounted internal to the camera body is one or more accelerometers 20 to allow camera orientation and/or movement to be determined. The accelerometer may be a microelectromechanical system ("MEMS") device or another type of accelerometer capable of measurement of orientation or movement, as needed for each of the functions described below. As will be apparent, the accelerometer may be a dual-axis device, or a plurality of single-axis accelerometers may be used. FIG. 2A shows a coordinate system applied to the camera of FIGS. 1A-1B. Earth's gravity is shown as a gravity vector 11 in the coordinate system, aligned along the "Y" axis. A "camera body vector" 28 is shown which is perpendicular to the long dimension of the camera. In exemplary embodiments, the orientation of the camera body vector 28 relative to the gravity vector 11 is determined from the outputs of the accelerometer.

Figure 3:
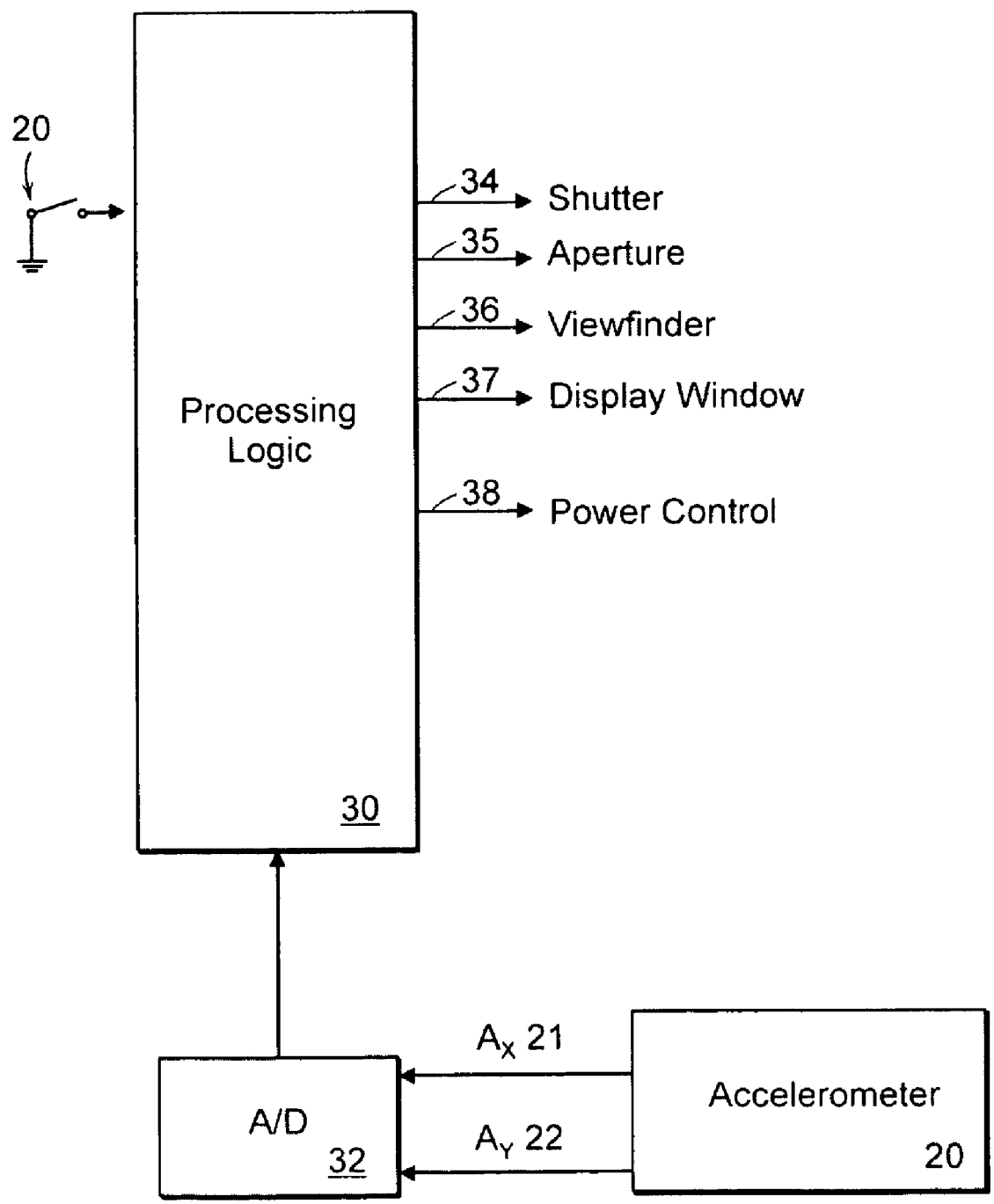
FIG. 3 schematically shows a circuit for controlling a camera according to embodiments of the present invention.

FIG. 3 is a schematic diagram of a circuit for controlling the camera 10 of FIGS. 1A and 1B, according to an embodiment of the invention. The outputs of accelerometer 20 are voltage levels, Ax 21 and Ay 22, whose values correspond the magnitude of the acceleration along "X" and "Y" axes, respectively. These accelerometer outputs are input to analog-to-digital converters 32 ("A/D"), which quantize the signals. The A/D output 34 is input to processing logic 30. The processing logic 30 may take a variety of forms, as are known in the art, including a microprocessor with memory and a stored program together with appropriate interface circuitry. Alternatively, the processing logic may take the form of dedicated logic elements ("ASIC") or the processing logic may be a mix of a microprocessor with dedicated logic elements. The output of a shutter switch 20 is input to the processing logic to allow a user to initiate picture taking. The processing logic provides outputs signals to control the shutter 34, to control the lens aperture 35, and to generate displays on the viewfinder 36 and on a viewfinder display screen 37, 18. The processing logic may also provide a variety of power conditioning outputs 38 to functional elements of the camera to put individual elements into a low power state. The display on the viewfinder and on the display window may be formed by combining text and graphics generated by the processing logic with the output of an image sensor, as is known in the art. In other embodiments of the invention, the circuit elements for controlling the camera may take on other forms that provide similar functionality. Other embodiments of the invention may not have every element shown in FIG. 3. For example, if the camera does not include a viewfinder display screen 18 on the back of the camera, the processing logic need not provide an output 37 to it.

User Interface Orientation

Figure 4:
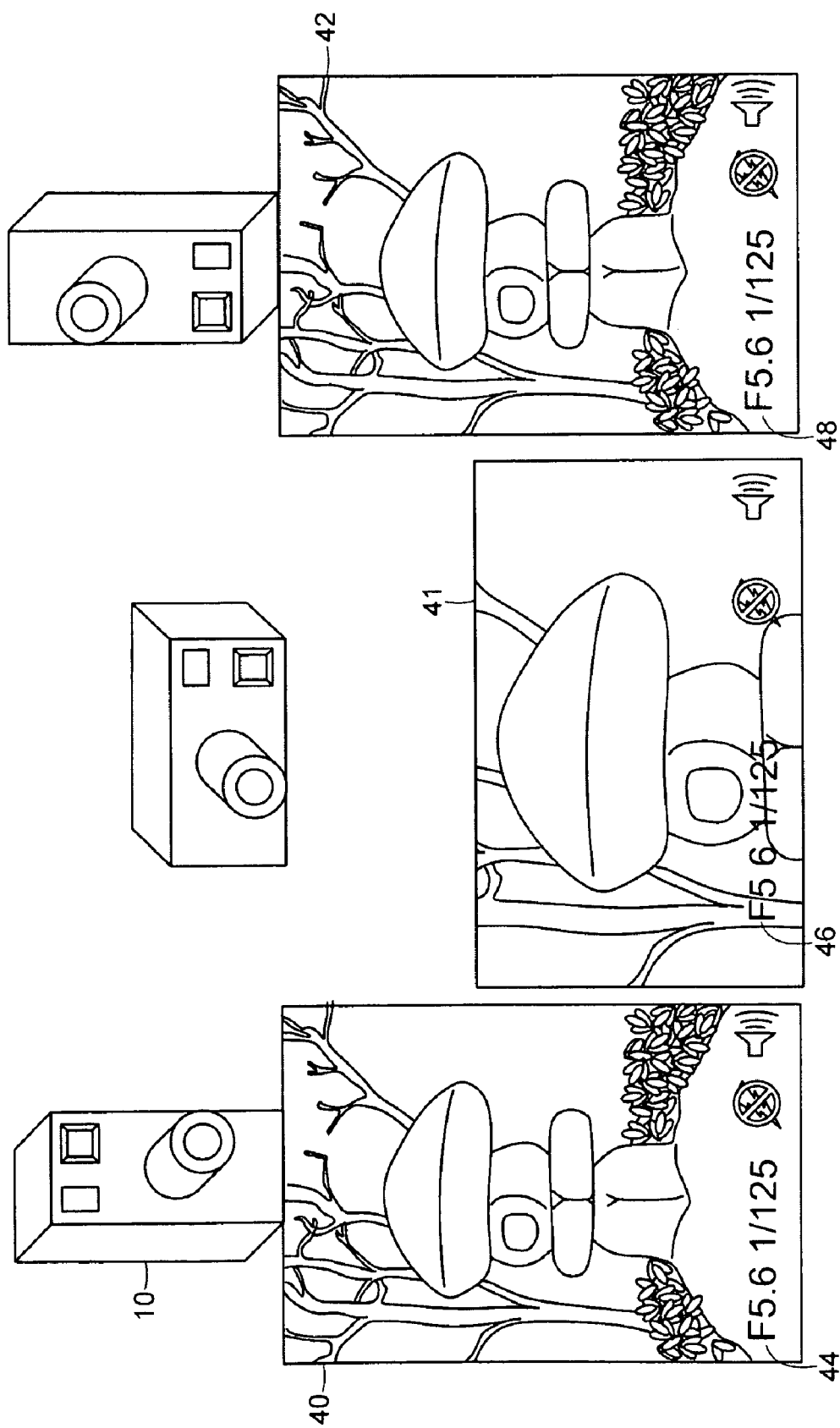
FIG. 4 illustrates right-side-up graphics on a camera viewfinder, generated by an embodiment of the invention.

In a first embodiment of the invention, accelerometer(s) 20 help determine the orientation of the camera with respect to earth's gravity. Based upon this determination, text and graphics information that is normally overlaid on an image in the viewfinder, or on another display, can be automatically rotated to be "right side up" to the user, as the camera is oriented in various directions. An example is shown in FIG. 4. Camera 10 in the leftmost instance 40 is oriented in the portrait mode and the caption 44 in the viewfinder is oriented so that the text is upright for the longer dimension of the picture. When the camera is rotated 90 degrees, to the landscape mode, as shown in the middle instance 41, the caption in the viewfinder 46 is rotated to be upright for the shorter dimension of the picture. When the camera is rotated an additional 90 degrees, the caption 48 is again shown upright for the longer dimension of the picture 42. Note that the captions 44, 48 for the leftmost instance 40 and the rightmost instance 42 have opposite orientations with respect to the camera body, but the same orientation with respect to the image. This occurs because the camera body is rotated 180 degrees between the leftmost and rightmost instances. In specific embodiments of the invention, captions such as the date and time can be added to the image captured by the camera and the caption can be oriented so that it is "right side up." That is, the caption on the image may be oriented so that it is opposite to the direction of the gravity vector for the camera's orientation, (i.e., pointing in an approximately vertical direction). Note that the camera's orientation (long dimension) will not, in general, align with the gravity vector (as in the leftmost instance in FIG. 3) or perpendicular to it (as in the middle instance in FIG. 3). For such intermediate situations, in embodiments of the invention, the caption will be oriented so that it is most nearly right side up.

Figure 5:
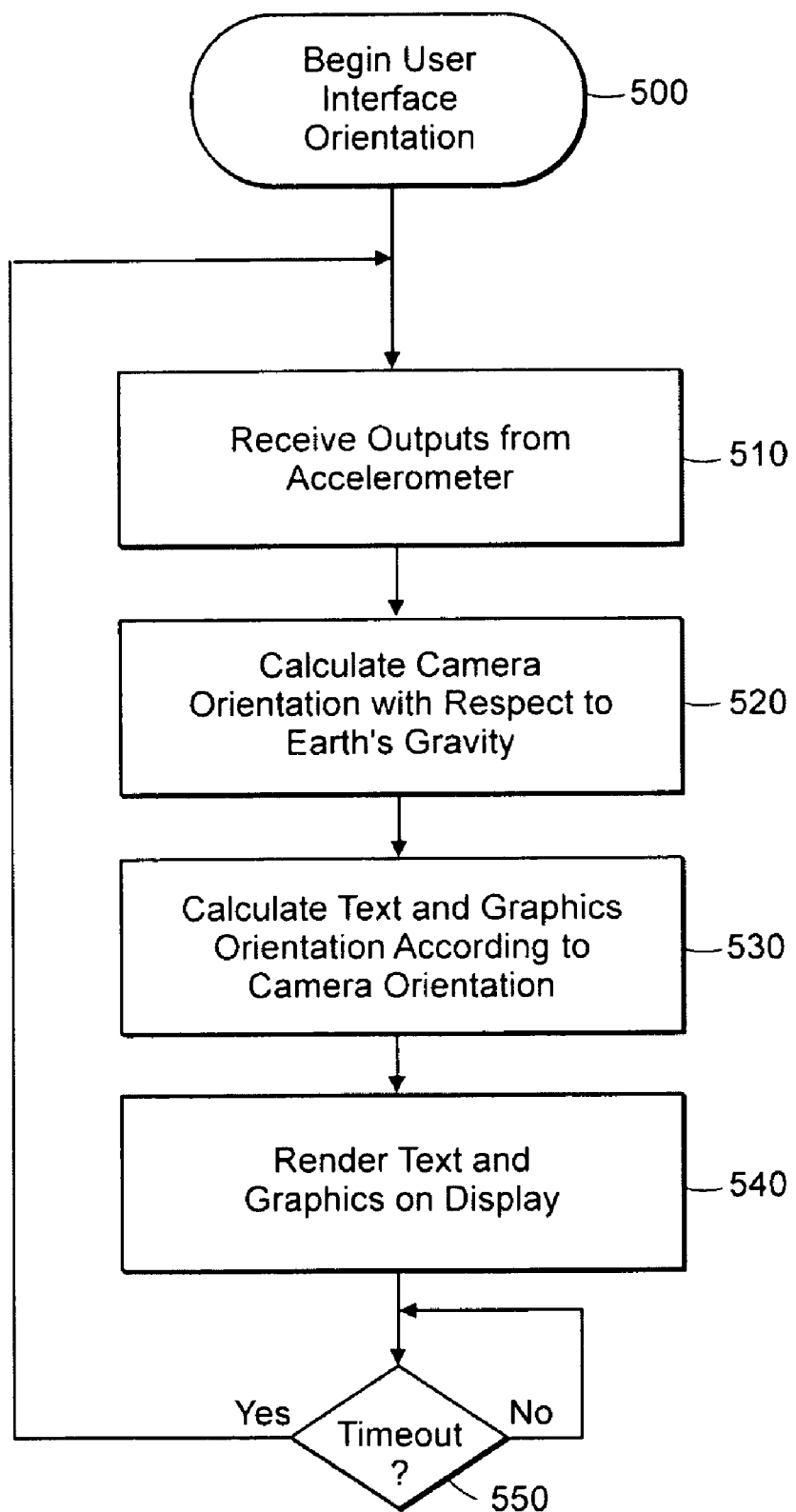
FIG. 5 is a flow diagram for an illustrative method of using orientation information to display "right side up" graphics on a picture image, according to an embodiment of the invention.

FIG. 5 shows a flow diagram 500 for user interface orientation according to an embodiment of the invention. Outputs Ax 21, Ay 22 of the accelerometers 20 are sampled 510 to determine the orientation of the camera body vector 28 with respect to the earth's gravity vector 11. An accelerometer(s) capable of measuring static (non-varying) accelerations along two axes is used. The angle θ between the camera body vector 28 and the gravity vector 11 is given by:

$$\theta = \text{Arctan}((Ay - Ay_o)/(Ax - Ax_o)) \qquad (1)$$

(The output of the accelerometer along each axis has previously been calibrated for reference orientations of the camera body vector with respect to the gravity vector, yielding values of $Ax_o$ and $Ay_o$. $Ax_o$ is the value along the x-axis when the camera body vector is aligned, as shown in the upper drawing in FIG. 2A; $Ay_o$ is the value for the y-axis for alignment of camera body vector 28 perpendicular to the gravity vector, as shown in the lower drawing in FIG. 2).

Figure 2B:
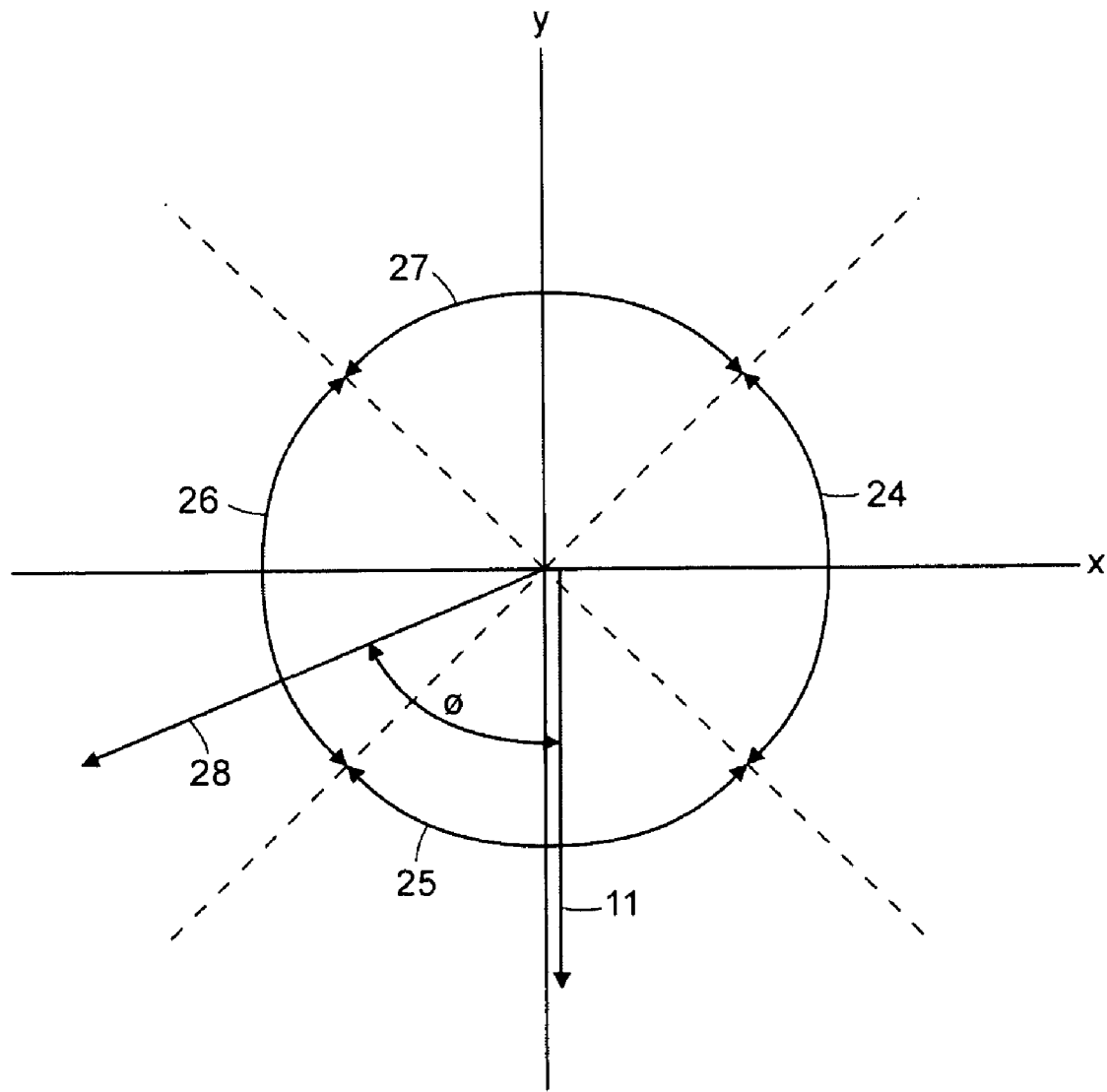
FIG. 2B shows possible orientation of the camera body vector relative to earth's gravity vector for orienting text and graphics, according to an embodiment of the invention.

The orientation of the camera body vector 28 with respect to the gravity vector 11 is resolved 520 into one of four quadrants (24, 25, 26, 27) shown in FIG. 2B. Text and graphics are then oriented 530, 540 as follows on the display:

| Quadrant | Text Alignment |
|---|---|
| 25 | Landscape mode; right side up text is opposite to camera body vector |
| 26 | Portrait mode; right side up text is perpendicular to camera body vector and rotated 90 degrees counter-clockwise from quadrant 25 text. |
| 27 | Landscape mode; right side up text is aligned with camera body vector |
| 24 | Portrait mode; right side up text is perpendicular to camera body vector and opposite to quadrant 26 text direction |

Text and graphics captions are rendered 530, 540 in the viewfinder display (e.g., 44, 46, 48) with the orientation so that it most nearly matches the direction that is upright (i.e., opposite to the direction of the gravity vector). The process is repeated 550 so that as the camera body is reoriented, the orientation of the text and graphic captions in the viewfinder display track the orientation of the camera with respect to the gravity vector. In specific embodiments of the invention, this process is repeated at a set time interval.

Artificial Horizon Display

Figure 6:
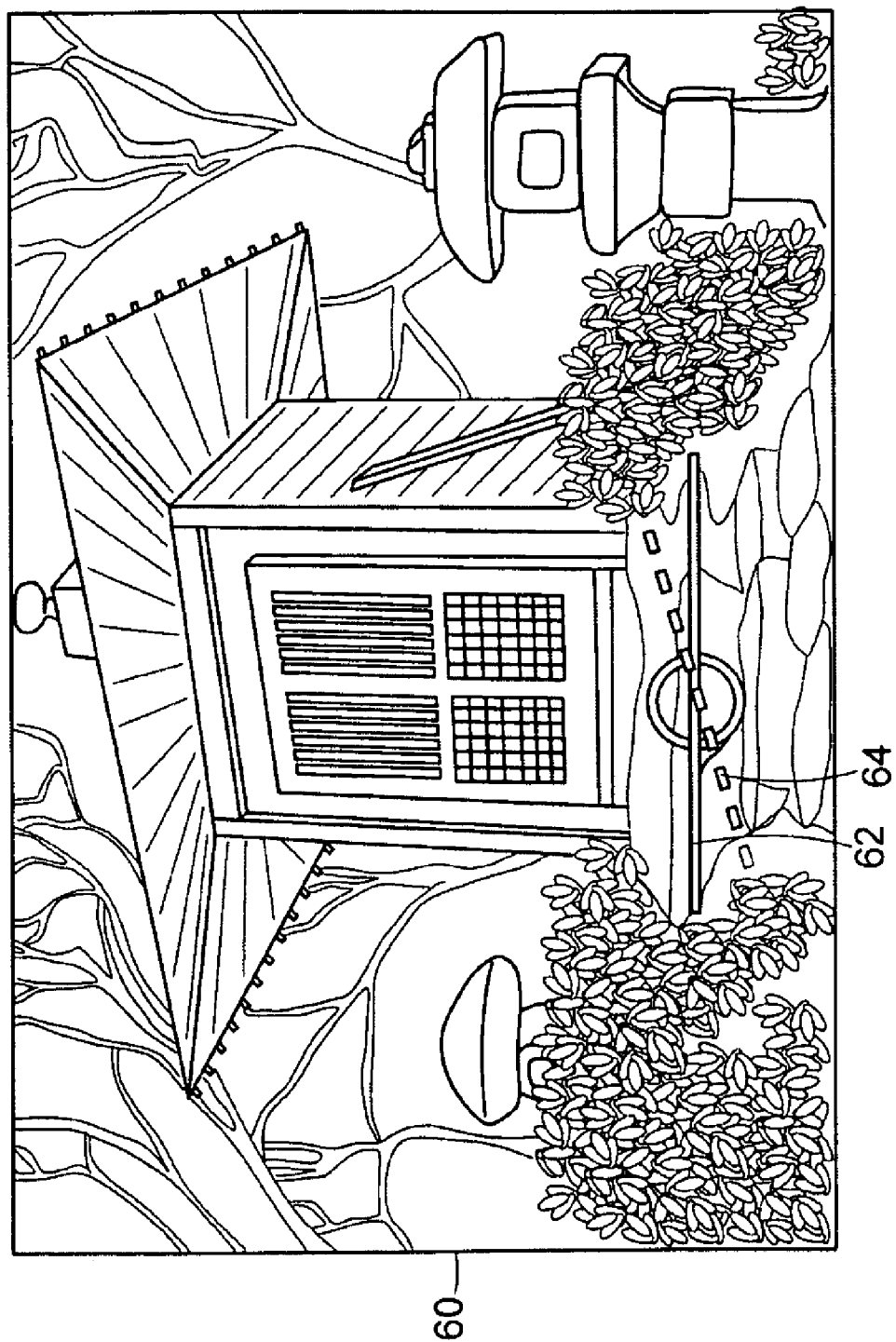
FIG. 6 illustrates display of an artificial horizon indicator to aid in framing a picture, according to an embodiment of the invention.

A further embodiment of the invention produces an artificial horizon display in the camera viewfinder based upon the gravity vector 11. The artificial horizon enables the picture to be framed so that one edge is parallel to the surface of the Earth. As shown in FIG. 6, for example, an "artificial horizon" indicator 64 can be displayed in the viewfinder display 60 as a dashed line to aid the user in framing the photograph. The user can then rotate the camera to align the artificial horizon indicator 64 with the subject. Of course, the "artificial horizon" indicator can be reoriented in the viewfinder based on the gross orientation of the camera (portrait or landscape), as determined from the accelerometer outputs. This determination would be similar to that shown above for the "user interface orientation" embodiment of the invention.

Figure 7:
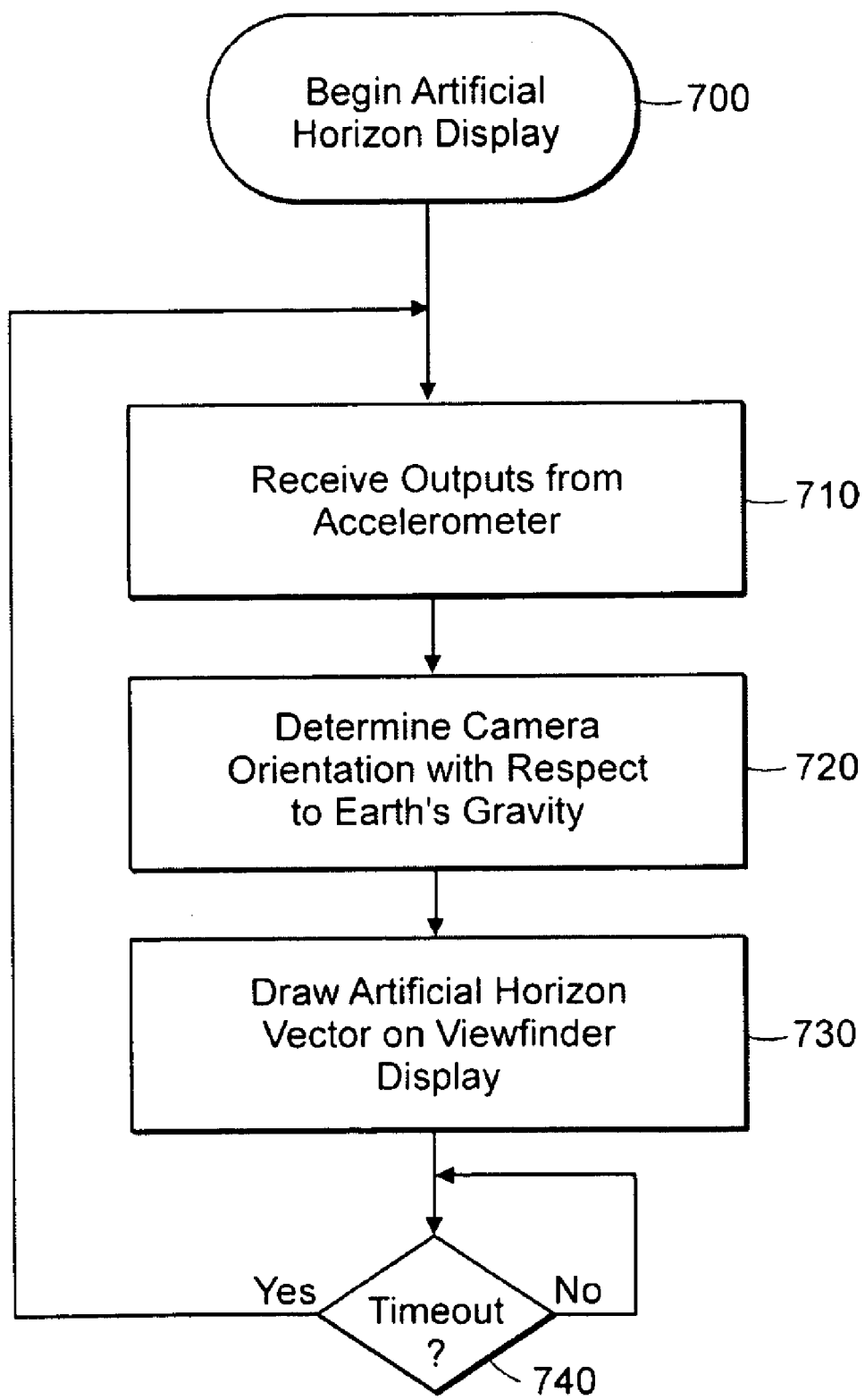
FIG. 7 is a flow diagram for an illustrative method of using orientation information to create an artificial horizon indicator on a display to aid in framing a picture, according to an embodiment of the invention.

FIG. 7 shows a flow diagram 700 for display of an artificial horizon on a camera viewfinder display according an embodiment of the invention. Outputs Ax 21, Ay 22 of the accelerometers 20 are sampled 710 to determine the orientation of the camera body with respect to the earth's gravity vector 11. The same accelerometer arrangement and calculations 720 may be used to determine camera body vector 28 orientation relative to the earth's gravity vector 11, as described above for the "right-side up" caption display embodiment of the invention. An artificial horizon vector 64 is rendered 730 on the camera viewfinder display as a dashed line based on the determined camera orientation. A reference vector 62 aligned with the viewfinder edge, may also be displayed to aid in framing the picture. Note that the misalignment of the two vectors is exaggerated in FIG. 6 to illustrate the concept. The process is repeated 740 so that as the camera body moves, the orientation of the artificial horizon vector in the viewfinder display tracks the orientation of the camera with respect to the gravity vector. In specific embodiments of the invention, the repetition rate of the process may be determined by a time interval. In other embodiments of the invention, the display of the artificial horizon may take other forms besides a vector. All such displays are intended to be within the scope of the present invention and will be referred to below, including in the appended claims as an "artificial horizon indicator."

Shutter Speed Control

Sharp photographs generally require that the camera not move during exposure. The ability to hold a camera steady, however, varies a great deal from person to person. In some cases, such as when on a moving vehicle, even an experienced photographer may not be able to hold a camera very steady. In illustrative embodiments of the invention, camera vibration is used as one input (along with lighting conditions) to determine image exposure values. An accelerometer mounted to a camera measures the vibration (i.e., acceleration variation) experienced by the camera for a few hundred milliseconds before exposure to determine an appropriate minimum shutter speed to ensure a sharp picture. The peak-to-peak acceleration is used along with the focal length of the lens to determine the minimum shutter speed allowable. In a specific embodiment of the invention:

$$\text{minimum shutter speed} = (0.5/\text{peak-to-peak acceleration})^2/(\text{focal length}) \quad (2)$$

For example, with a 20 mm focal length and 0.5 m/s$^2$ of vibration, the minimum shutter speed would be 1/20 second. In some embodiments of the invention, a table of minimum shutter speeds is calculated according to equation (2) and a table look-up can then be performed to determine minimum shutter speed.

Figure 8:
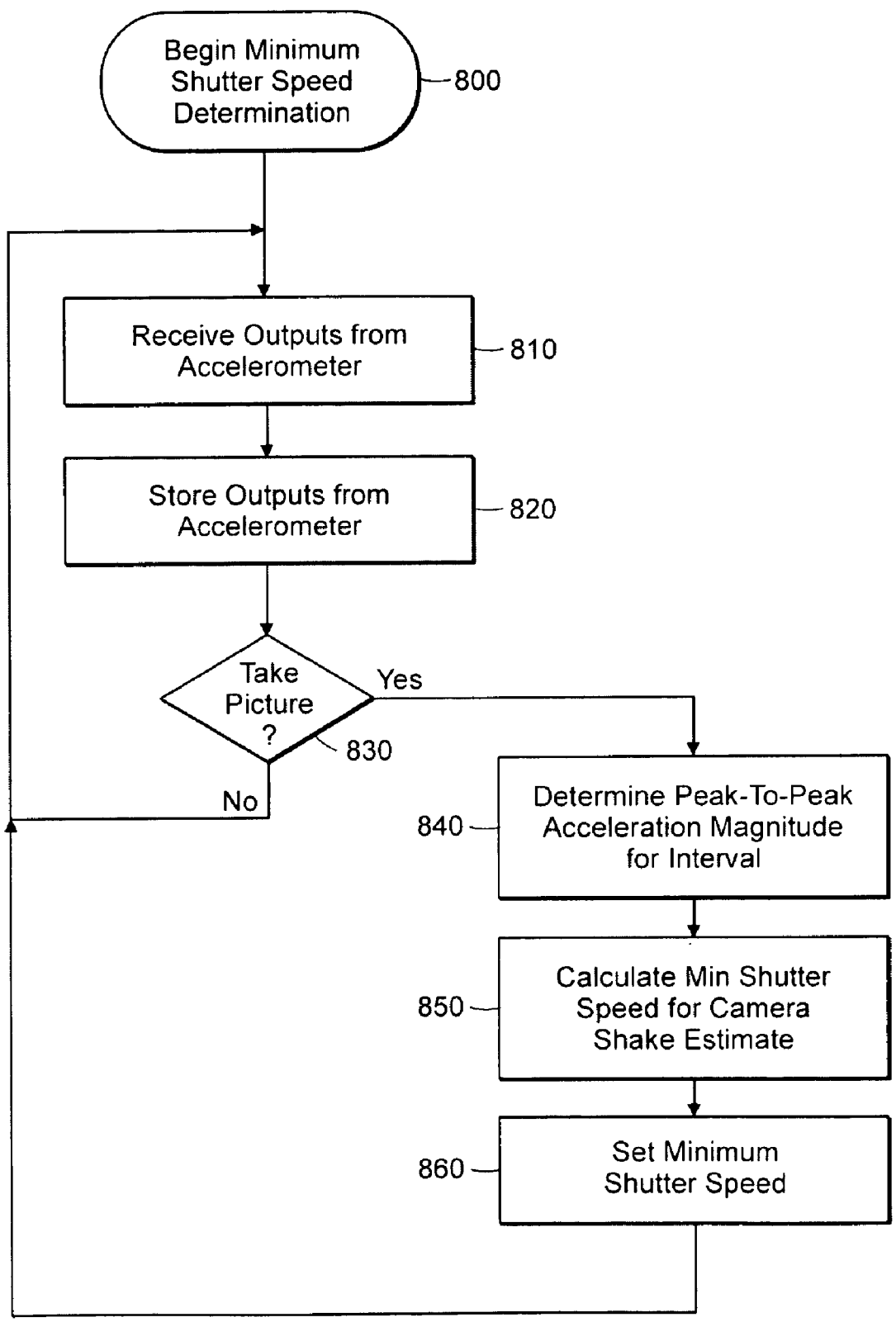
FIG. 8 is a flow diagram for a method of using vibration data to determine minimum shutter speed, according to an embodiment of the invention.

As shown in FIG. 3, according to an embodiment of the invention, the outputs of an accelerometer are connected to the input of an analog-to-digital ("A/D") converter 32. The output of the A/D converter is connected to processing logic 30. In this embodiment of the invention, the accelerometer needs to measure dynamic acceleration, but need not measure orientation. As shown in the flow diagram of FIG. 8 800, the processing logic 30 periodically receives 810 the outputs of the A/D converter 32 and stores the A/D converter outputs and time of observation 820. When picture taking is initiated, 830, the peak-to-peak acceleration magnitude is calculated 840 for the preceding time interval based on the stored accelerometer values. Values older than the most recent time interval may be discarded. The minimum shutter speed, 850, 860 is then determined from equation 2.

In some embodiments, the peak-to-peak acceleration magnitude is calculated for more than one axis. The larger of the values of peak-to-peak acceleration magnitude for the respective axes is then used for the minimum shutter speed calculations. In preferred embodiments of the invention, the time interval over which the peak-to-peak acceleration magnitude is determined may range from about 100 milliseconds to about 500 milliseconds.

Camera Use Detector

Other embodiments of the invention use accelerometers to determine if a camera is in use. For example, a camera oriented such that the lens is pointing up and experiencing very little vibration is likely set on a table and is not about to take a picture. To that end, such embodiments use an accelerometer to measure the orientation of the camera and to measure vibration. These measurements are used to determine whether the camera is in use. The determination of camera use, in turn, can be used to perform tasks to improve camera function, such as reducing power consumption.

Figure 9:
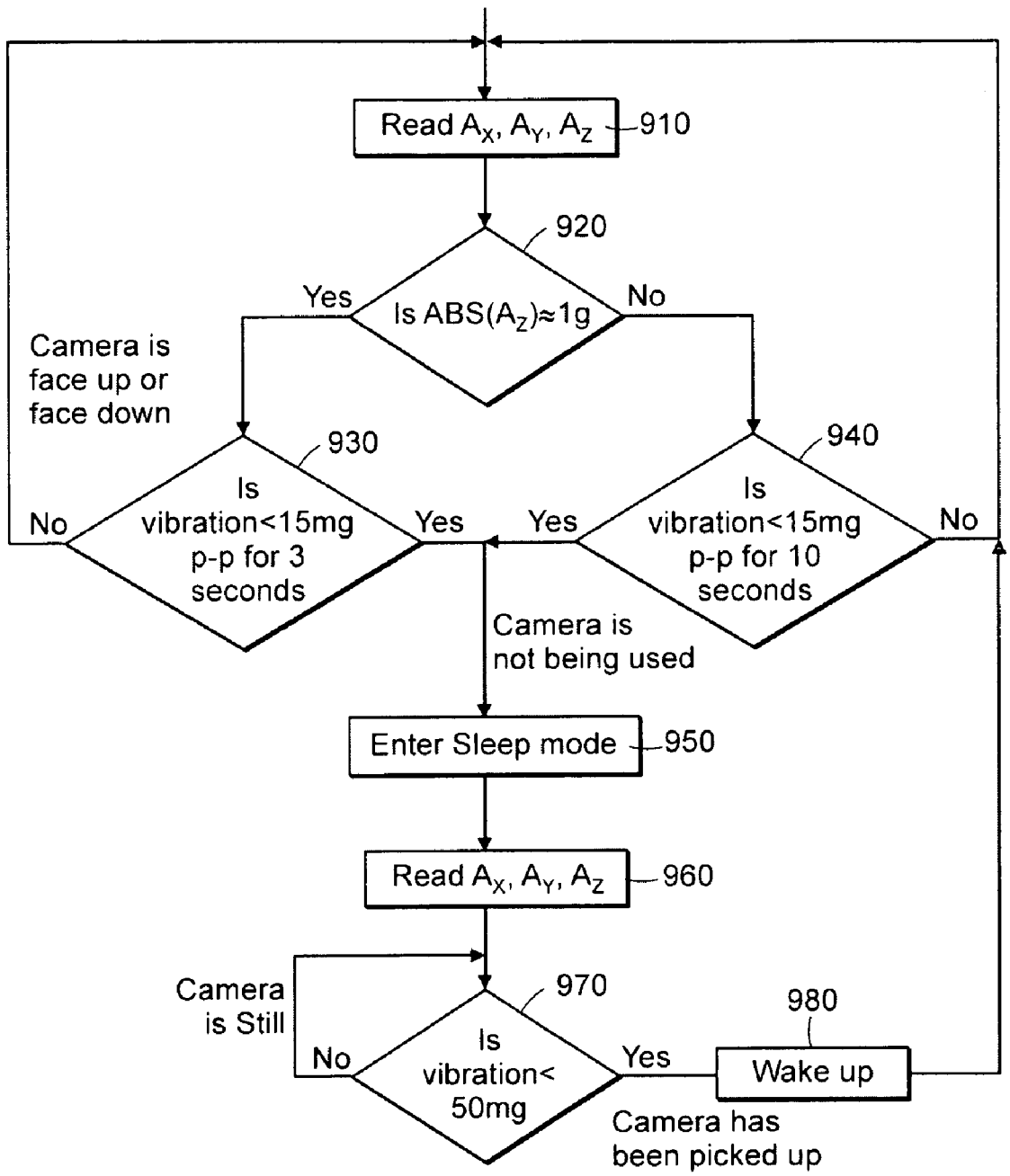
FIG. 9 is a flow diagram for a method of using orientation and vibration data to determine when a camera is in use, according to an embodiment of the invention.

In an embodiment of the invention, the orientation of the camera and peak-to-peak acceleration magnitude over a given time duration are determined, as described in connection with the preceding embodiments of the invention. These values are then used to determine camera use. An exemplary algorithm for determining camera use is shown in FIG. 9. First accelerometer outputs are read 910. In this embodiment, accelerometers to determine static acceleration (orientation) and dynamic acceleration Ax, Ay, Az along three orthogonal axes are provided. In other embodiments less than three axes may be sensed. The absolute magnitude along an axis aligned with the camera lens, Az, is measured 920 to determine if the magnitude is approximately equal to one g. If it is not, then the camera is not face up or face down, and the peak-to-peak magnitude of the acceleration (vibration) for the preceding ten seconds is compared to 15 mg. If vibration exceeds 15 mg, the camera is determined to be in use. The accelerometer outputs are then read again 910 and the process repeated. If the absolute magnitude along an axis aligned with the camera lens, Az, is approximately equal to one g 920, then the camera is face up or face down. The peak-to-peak magnitude of the acceleration (vibration) for the preceding three seconds is compared 930 to 15 mg. If vibration exceeds 15 mg, the camera is determined to be in use. The accelerometer outputs will be read again 910 and the process repeated. If the vibration is less than 15 mg, then the camera is determined to be idle and the camera may enter 950 a "sleep" mode. In sleep mode, the accelerometer outputs are measured periodically 960. If the vibration equals or exceeds 50 mg, the camera has been picked up and the camera enters a "wake-up" state 980. The process then repeats 910. The values for vibration magnitude and duration in this algorithm are provided for example only, and not by way of limitation. Other time duration thresholds and vibration magnitude thresholds may be used in other embodiments of the invention. In embodiments of the invention, when the camera enters the sleep mode 950, as described above, processing logic 30 place elements of the camera into a low power state. For instance, viewfinder displays may be de-energized and motors that cause optical lens zoom may be powered down. When the camera enters the wake-up state 980, these actions may be reversed to ready the camera for use.

Embodiments of the invention can use a wide variety of accelerometers. For example, if implemented as a MEMS device, the accelerometer may be similar to that disclosed by U.S. Pat. No. 5,939,633, which is assigned to Analog Devices, Inc. of Norwood, Mass., the disclosure of which is incorporated herein, in its entirety, by reference. Accelerometers implementing non-MEMS technologies also may be used in other embodiments. Accordingly, discussion of MEMS accelerometers is by way of example only.

Systems according to embodiments of the invention may be described by the following clauses:

1. A camera system for aligning a camera to the Earth' horizon, the system comprising:
 a camera including an accelerometer mounted on the camera for determining camera orientation with respect to gravity and a viewfinder display; and
 a processor including a memory, the memory containing instructions that cause the processor to:
 determine an orientation of the camera with respect to gravity using the accelerometer; and
 display an artificial horizon indicator on the viewfinder display based on the determined orientation of the camera.

2. A camera system for orienting icons displayed in a camera viewfinder comprising:
 a camera including an accelerometer mounted on the camera for determining camera orientation with respect to gravity and a viewfinder display; and
 a processor including a memory, the memory containing instructions that cause the processor to:
 determine an orientation of the camera with respect to gravity using the accelerometer; and
 display a given icon on an image produced by the camera, wherein the given icon's orientation is based at least in part on the determination of the orientation of the camera using the accelerometer.

3. A camera system for adjusting image exposure time for a camera to reduce movement-induced image blurring, the system comprising:
 the camera including an accelerometer mounted on the camera for determining camera movement; and
 a processor including a memory, the memory containing instructions that cause the processor to:
 measure a peak-to-peak acceleration magnitude using the accelerometer for a given time duration for the camera;
 adjust the image exposure time based at least in part on the peak-to-peak acceleration magnitude over the given time duration.

4. A camera system according to clause 3, wherein adjusting the image exposure time includes calculating a minimum shutter speed.

5. A camera system for determining a state of utilization for a camera comprising:
 a camera including an accelerometer mounted on the camera for determining an orientation of the camera with respect to gravity and a peak-to-peak acceleration magnitude over a given time duration; and
 a processor including a memory, the memory containing instructions that cause the processor to:
 determine an orientation of the camera using the accelerometer;
 determine a peak-to-peak acceleration magnitude over a given time duration using the accelerometer; and
 identify the state of utilization for the camera based at least in part on the camera orientation determination and the peak-to-peak acceleration magnitude over a given time duration.

Computer program products according to embodiments of the invention may be described by the following clauses:

1. A computer program product for use on a processor in a camera system, the camera system including an accelerometer mounted on the camera for determining camera orientation with respect to gravity and a viewfinder display; the computer program product comprising a computer usable medium having computer readable program code thereon, the computer readable program code including program code for:
 determining an orientation of the camera with respect to gravity using the accelerometer; and
 displaying an artificial horizon indicator on the viewfinder display based on the determined orientation of the camera.

2. A computer program product for use on a processor in a camera system, the camera system including an accelerometer mounted on the camera for determining camera orientation with respect to gravity and a viewfinder display; the computer program product comprising a computer usable medium having computer readable program code thereon, the computer readable program code including program code for:
 determining an orientation of the camera with respect to gravity using the accelerometer; and
 displaying a given icon on an image produced by the camera, wherein the given icon's orientation is based at least in part on the determination of the orientation of the camera using the accelerometer.

3. A computer program product for use on a processor in a camera system, the product for adjusting image exposure time for a camera to reduce movement-induced image blurring, the camera system including an accelerometer mounted on the camera for determining camera movement; the computer program product comprising a computer usable medium having computer readable program code thereon, the computer readable program code including program code for:
 measuring a peak-to-peak acceleration magnitude using the accelerometer for a given time duration for the camera;
 adjusting the image exposure time based at least in part on the peak-to-peak acceleration magnitude over the given time duration.

4. A computer program product according to clause 3, wherein adjusting the image exposure time includes calculating a minimum shutter speed.

5. A computer program product for use on a processor in a camera system, the product for determining a state of utilization for the camera system, the camera system including an accelerometer mounted on the camera for determining camera movement and orientation; the computer program product comprising a computer usable medium having computer readable program code thereon, the computer readable program code including program code for
 determining an orientation of the camera using the accelerometer;
 determining a peak-to-peak acceleration magnitude over a given time duration using the accelerometer; and identifying the state of utilization for the camera based at least in part on the camera orientation determination and the peak-to-peak acceleration magnitude over a given time duration.

Logic performing the processing functions may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer exec structure form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer execustructure form (e.g., via an interpreter), or the source code may be converted (e.g., via a translator, assembler, or compiler) into a computer executable structure form.

The computer program may be fixed in any form (e.g., source code form, computer execustructure form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

Although the above discussion discloses various exemplary embodiments of the invention, it should be apparent that those skilled in the art can make various modifications that will achieve some of the advantages of the invention without departing from the true scope of the invention. Other variations and modifications of the embodiments described above are intended to be within the scope of the present invention as defined in the appended claims

What is claimed is:

1. A method for determining a state of utilization for a camera comprising:
    a. providing the camera, the camera including an accelerometer for determining an orientation of the camera with respect to the direction of gravity and a peak-to-peak acceleration magnitude over a given time duration;
    b. determining when the axis of the camera lens is substantially aligned with the direction of gravity using the accelerometer;
    c. determining a peak-to-peak acceleration magnitude over the given time duration using the accelerometer; and
    d. identifying the state of utilization of the camera based at least in part on the determination of when the axis of the camera lens is substantially aligned with the direction of gravity and the determination of the peak-to-peak acceleration magnitude over the given time duration.

2. A method according to claim 1 wherein the accelerometer is a MEMS.

3. A method according to claim 1 wherein identifying the state of utilization for the camera includes determining whether the peak-to-peak acceleration magnitude exceeds 15 mg.

4. A method according to claim 1 further including:
    e. placing the camera in a lower power state based on the identified state of utilization.

5. A system for determining a state of utilization for a camera comprising:
    an accelerometer mounted on the camera for determining an orientation of the camera with respect to the direction of gravity and a peak-to-peak acceleration magnitude over a given time duration; and
    a processor in the camera including a memory, the memory containing instructions that cause the processor to:
    determine when the axis of the camera lens is substantially aligned with the direction of gravity using the accelerometer;
    determine a peak-to-peak acceleration magnitude over the given time duration using the accelerometer; and
    identify the state of utilization of the camera based at least in part on the determination of when the axis of the camera lens is substantially aligned with the direction of gravity and the determination of the peak-to-peak acceleration magnitude over the given time duration.

6. A system according to claim 5 wherein identifying the state of utilization of the camera includes determining whether the peak-to-peak acceleration magnitude exceeds 15 mg.

7. A system according to claim 5 further including instructions that cause the processor to place the camera in a lower power state based on the identified state of utilization.

8. A system according to claim 5 wherein the accelerometer is a MEMS.

* * * * *